(No Model.) 5 Sheets—Sheet 1.

O. B. PECK.
CENTRIFUGAL SEPARATOR.

No. 560,631. Patented May 19, 1896.

Witnesses: Inventor,

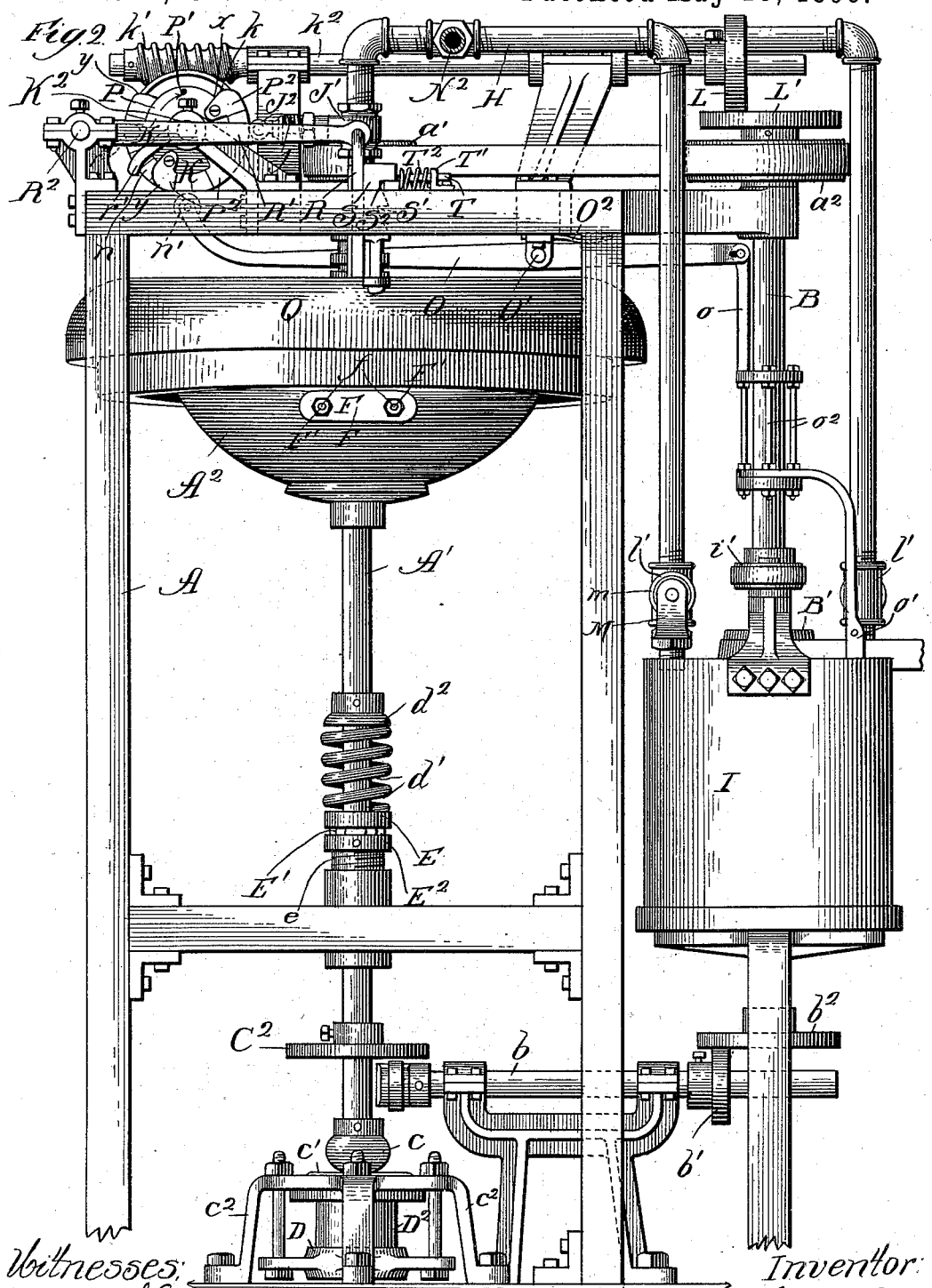

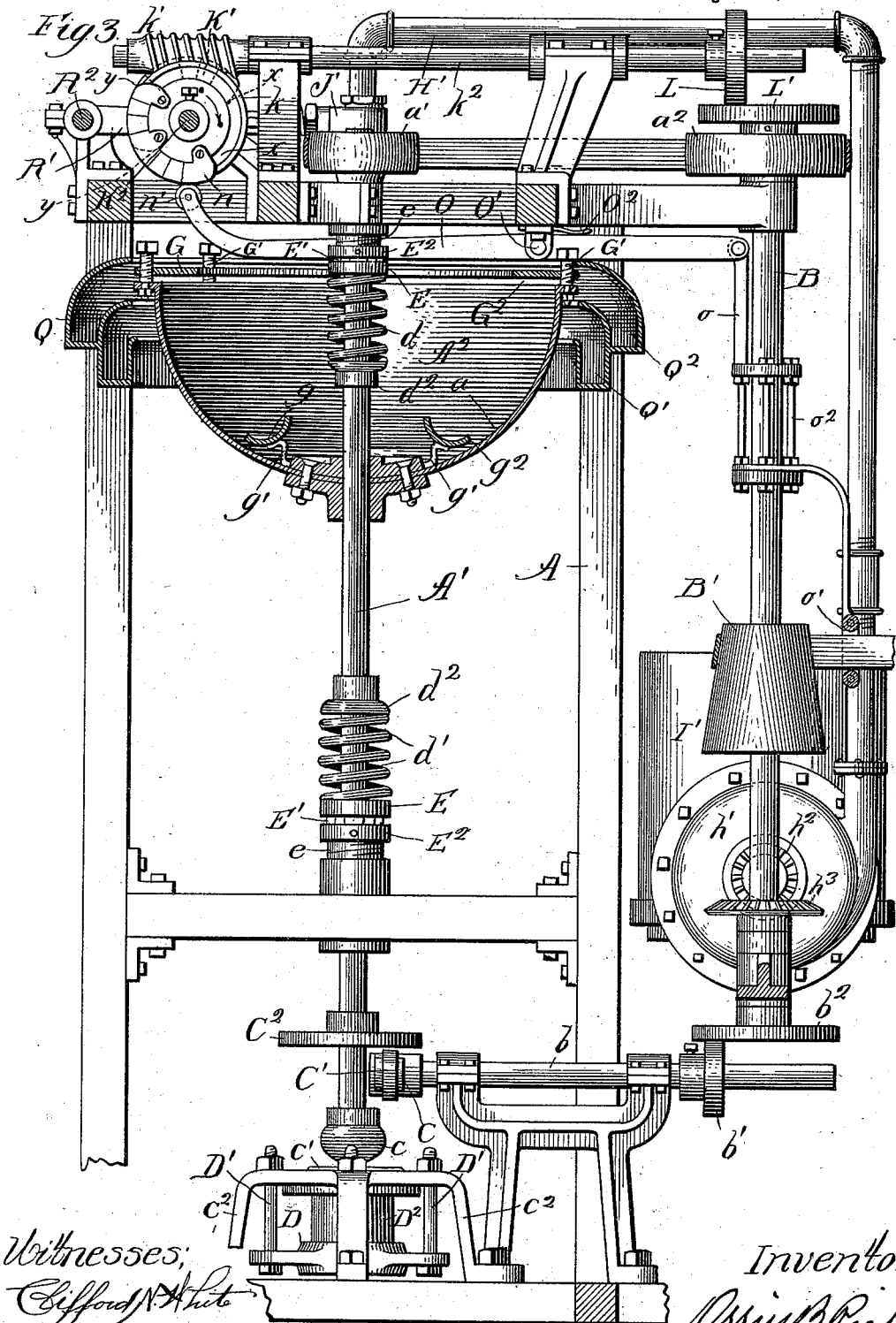

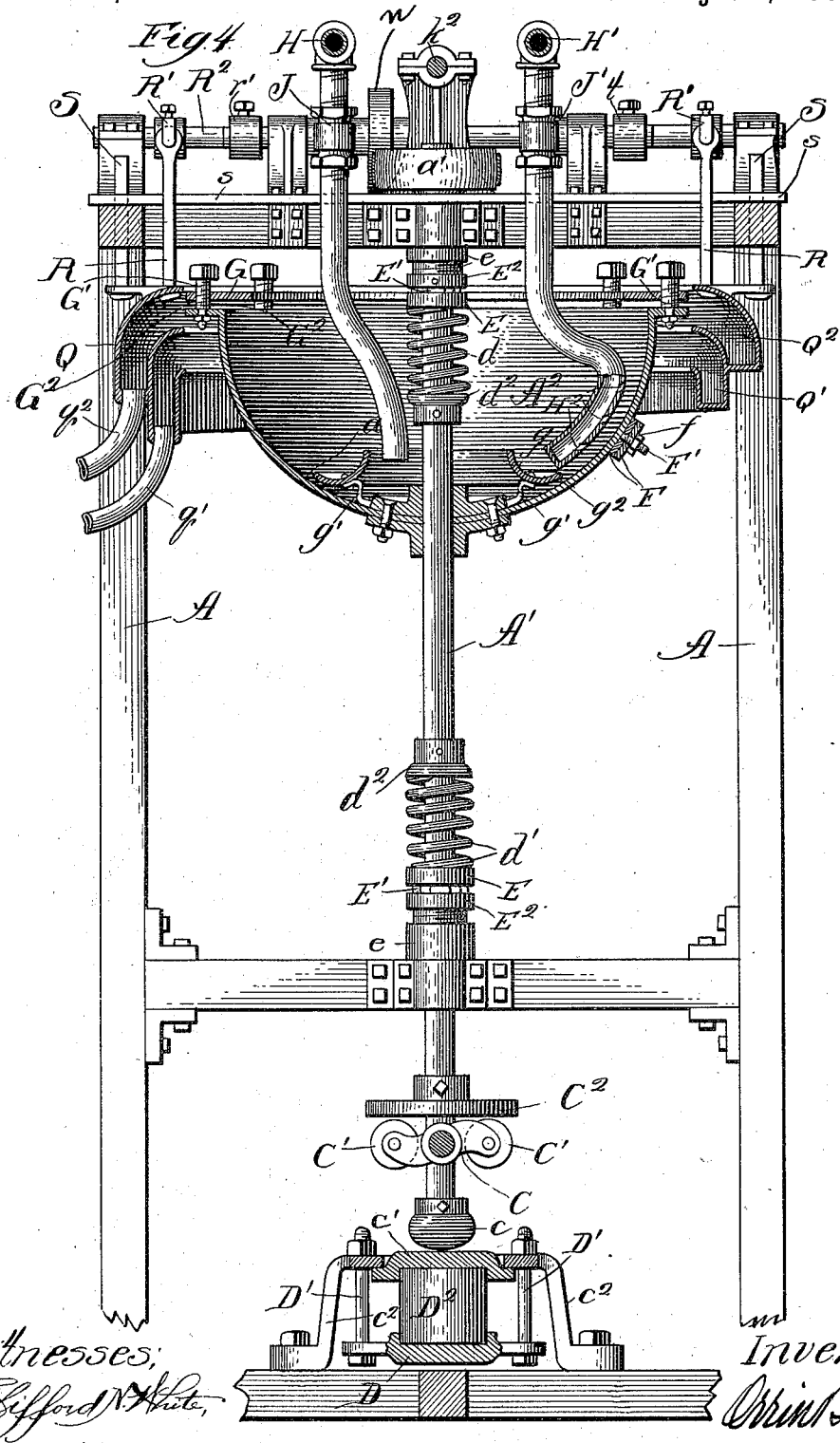

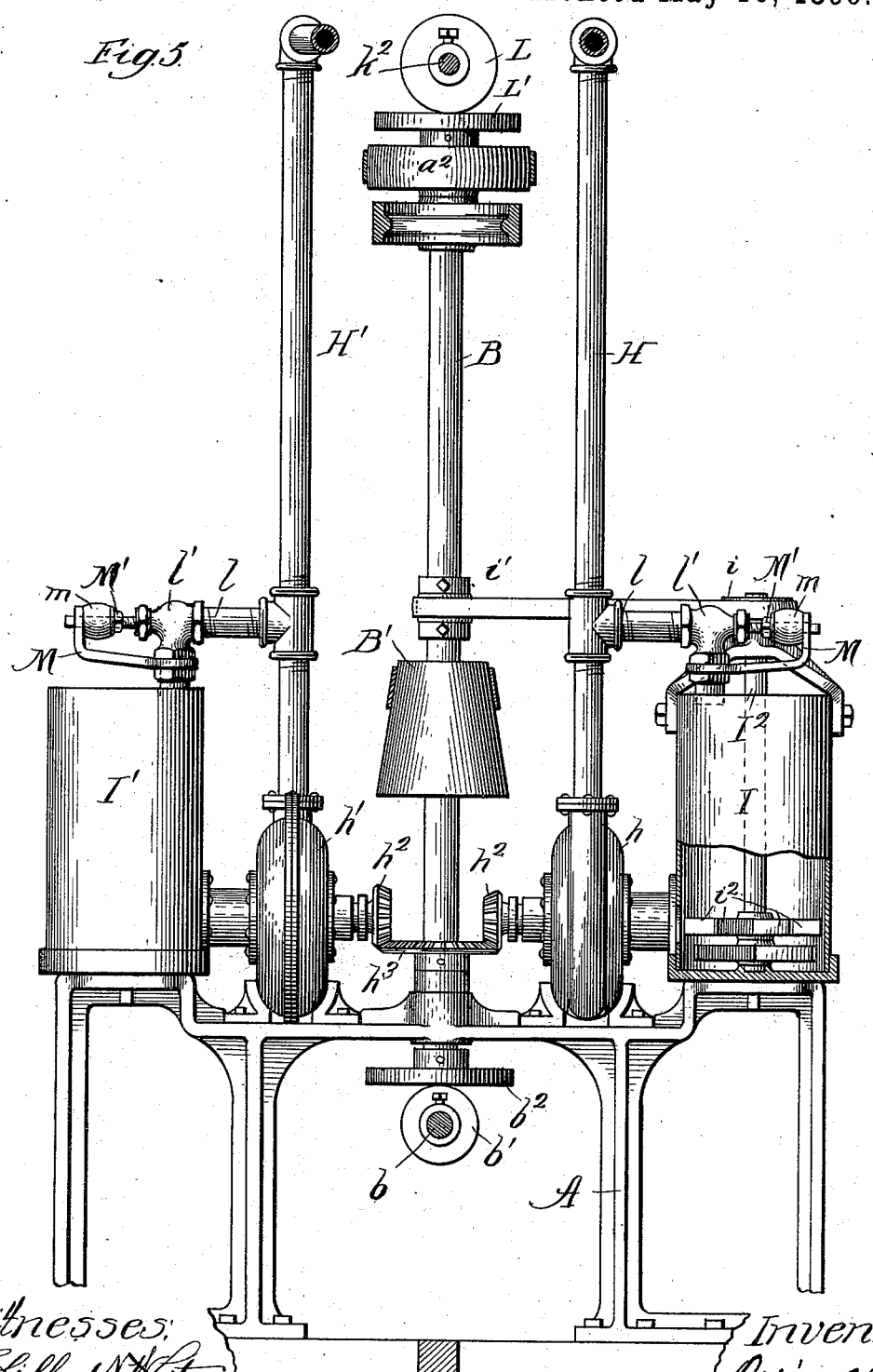

UNITED STATES PATENT OFFICE.

ORRIN B. PECK, OF CHICAGO, ILLINOIS, ASSIGNOR TO MELINDA PECK, OF SAME PLACE.

CENTRIFUGAL SEPARATOR.

SPECIFICATION forming part of Letters Patent No. 560,631, dated May 19, 1896.

Application filed April 9, 1894. Serial No. 506,875. (No model.)

*To all whom it may concern:*

Be it known that I, ORRIN B. PECK, a citizen of the United States, residing at Chicago, in the county of Cook and State of Illinois, have invented a new and useful Improvement in Centrifugal Separators, of which the following is a specification.

My invention relates more particularly to centrifugal ore-separators, and has for its object various improvements in that class of machines, as hereinafter fully set forth.

Figure 1:
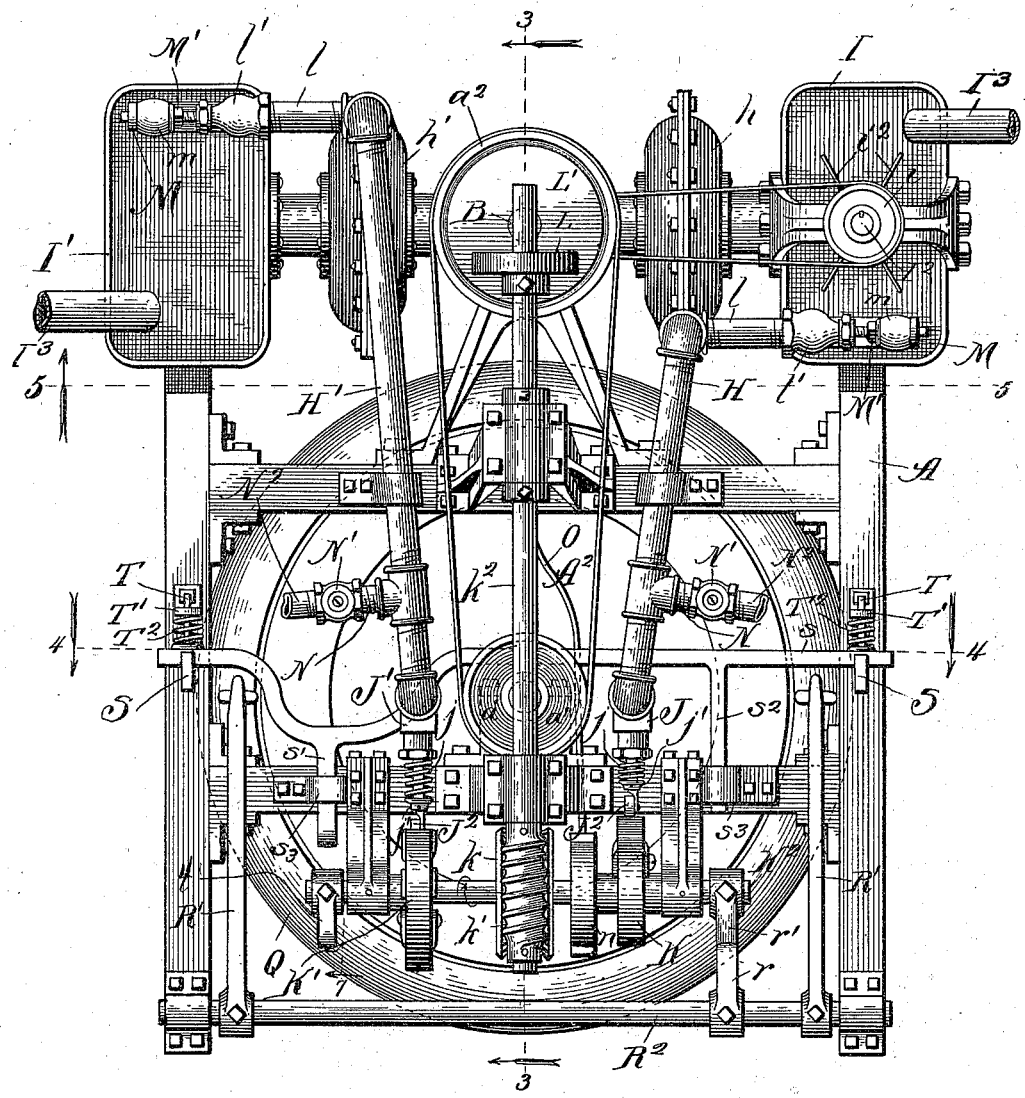
Figures 6, 7:
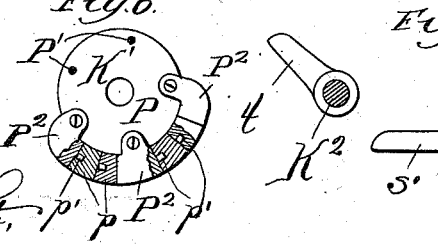

In the accompanying drawings, Figure 1 shows a top plan view of the entire machine; Fig. 2, a full side elevation looking from the right of Fig. 1; Fig. 3, a longitudinal section on the line 3 of Fig. 1; Fig. 4, a transverse section on the line 4 of Fig. 1. Fig. 5 is a transverse section on the line 5 of Fig. 1. Fig. 6 is a detail of one of the actuating-cams, and Fig. 7 is a detail of the finger $t$ for releasing the receiving-trough and permitting it to drop. All sections are taken in the direction indicated by the arrows.

Similar letters refer to like parts throughout the several figures of the drawings.

A designates a framework, in which is supported a vertical shaft A', journaled to permit both rotation and reciprocation. Upon this shaft is mounted the treatment vessel $A^2$, provided with an interior separating-surface $a$ and rotated by a pulley $a'$ near its upper extremity, from which a belt passes over a pulley $a^2$ on a counter-shaft B, preferably supported in the framework. The counter-shaft is driven by a cone-pulley B', over which passes a belt from any suitable source of power.

In the lower part of the framework is journaled a horizontal shaft $b$, preferably rotated by means of a friction-roll $b'$, adjustably secured thereon by a set-screw and bearing against the surface of a friction-disk $b^2$ upon the lower extremity of the counter-shaft. At the opposite end of the shaft $b$, near the lower end of the main shaft A', is secured a cam-bar C, in the ends of which are mounted antifriction-rollers C'. In the rotation of the cam-bar these rollers engage the under surface of a contact portion or plate $C^2$, adjustably secured to the shaft A' by a set-screw. Upon the lower extremity of the shaft is mounted a removable contact-head $c$, which contacts with a plate $c'$, supported on a chair $c^2$ by means of a plate D, adjustably suspended from the chair by bolts D' and having an interposed elastic cushion or spring $D^2$, preferably of rubber. As the bowl-shaft falls from the point to which it has been raised by the cam-rollers in their revolution the contact-head strikes the plate $c'$ and the shock or concussion is transmitted through the shaft and produces a vibration of the separating-surface. The intensity of this vibration may be varied by moving the friction-roll $b'$ toward or from the center of the disk, varying the speed of rotation for the shaft $b$, and therefore the number of shocks imparted to the shaft A' by its fall in a given time, irrespective of the speed of rotation of the counter-shaft, or the position of the contact-plate $C^2$ will control the distance to which the shaft is raised and thus the intensity of vibration for each concussion. This latter may be further varied by the degree of compression of the cushion $D^2$ by the nuts upon bolts D', the cushion when least yielding making the shock most sharp. Instead of the particular form of cam shown any equivalent device might be used for raising the shaft and permitting it to drop.

To further control and modify the vibration of the separating-surface, the bowl-shaft has encircling it spiral springs $d$ $d'$, located between collars $d^2$ $d^2$, adjustably secured to the shaft by set-screws, and loose collars E E, the latter resting upon a series of antifriction-balls E' E', interposed between the collars E E and internally-threaded collars $E^2 E^2$, supported upon externally-threaded sleeves $e$ $e$, surrounding the shaft and secured to cross-beams of the framework. The spring $d$, compressed by the upward movement of the shaft, acts to increase the force of gravity and accelerate its downward movement, increasing the intensity of the concussion between the contact-head and the elastically-supported plate, while the spring $d'$ is compressed by this downward movement and aids the cushion $D^2$ in giving a quick, sharp upward return of the shaft before it is raised by the cam. By varying the position of the collars $d^2$ $d^2$ and $E^2$ $E^2$ the tension of the springs $d$ $d'$ may be adjusted, thus varying their resistance to the reciprocation of the bowl-shaft and the force with which they act to aid its upward and downward movement.

As an alternative or additional means for imparting vibration to the separating-surface there may, if desired, be secured upon the exterior of the treatment vessel a weight or weights, preferably in the form of plates F F, which are perforated to allow them to be slipped on bolts F' F', extending outwardly from the wall of the vessel, they being held upon these bolts by nuts $f$ upon the threaded ends. This unequal distribution of weight imparts a tremor to the vessel in its rotation, vibrating the separating-surface. The intensity of this vibration may be altered by putting a greater or less number of plates upon the supporting-bolts or by using heavier or lighter plates, thus increasing the amount of weight by which the vessel is out of balance.

At the top of the treatment vessel is adjustably supported an inwardly-extending annular plate G, supported a slight distance from the upper edge by means of bolts G', screwed through the plate, and supported by a shoulder resting upon a flange at the top of the vessel, leaving between the two a discharge-opening $G^2$. The reduced portions of the bolts passing through the flange turn loosely therein and are retained against vertical movements by nuts upon the lower ends. By suitably adjusting the plate this construction, when desired, permits a body of liquid to be retained in the vessel during the operation, insuring the submergence of the material upon the separating-surface. Into the vessel extends a pipe or conduit H for feeding the material to be treated, mingled with a liquid, preferably water. This pipe projects nearly to the bottom thereof and at a point within a curved ring $g$, surrounding the axis and supported at a short distance from the separating-surface by arms $g'$, leaving an annular opening $g^2$. This ring serves to deflect the material along near the separating-surface beneath the body of liquid and serves to somewhat retard its flow, preventing it from progressing toward the discharge-point until it has acquired the same velocity as the vessel. A second pipe or conduit H' also extends into the vessel, its lower portion being parallel to the separating-surface for a considerable part of the distance between the deflecting-ring and the top of the vessel, and in this pipe are a series of perforations $H^2$, which serve to deliver jets of a clear liquid, preferably water, over the separating-surface and the material thereon. These orifices are inclined upward in a direction toward the discharge-opening and serve by the impact of the jets therefrom to wash material toward the same.

The pipes H and H' extend to right and left handed rotary pumps $h$ $h'$ or other forcing means, which are connected to receptacles or tanks I I' for holding material and liquid and a clear liquid, respectively. Both pumps and tanks may be mounted directly upon the frame A, and the former are preferably driven in opposite directions by means of bevel-gears $h^2$ upon their shafts, meshing with a bevel-gear $h^3$ upon the counter-shaft. Supply-conduits $I^3$ $I^3$ keep the tanks properly filled. In the material-tank is placed a vertical shaft $I^2$, journaled in a cross-bar supported thereon, and rotated by a belt extending over pulleys $i$ $i'$ on the shaft $I^2$ and the counter-shaft, respectively. This vertical shaft is provided with rows of agitating-bars $i^2$, which serve in their rotation to disturb the material and maintain it in suspension in the liquid in a proper condition to be delivered by the pump to the treatment vessel.

In the pipes H H' are valves J J', upon the stems of which are rollers $J^2$ $J^2$, pressed outward by spiral springs $j$ $j$, encircling the valve-stems and interposed between movable collars $j'$ $j'$ and the valve, against cams K K', which intermittently or periodically open and close the material and liquid valves, respectively. These cams are mounted upon a transversely-extending shaft $K^2$, supported above the treatment vessel, which carries the elements for effecting the automatic action of the parts, and is rotated at a comparatively slow speed by a worm-wheel $k$, meshing with a worm $k'$ upon the end of a longitudinal shaft $k^2$. This shaft $k^2$ has upon its opposite extremity a friction-roll L, movably secured thereon by a set-screw, which rotates it by contact with the upper face of a friction-disk L' at the top of the counter-shaft. In short branch pipes $l$ $l$, extending from the pipes H H', are relief-valves $l'$ $l'$, which serve to divert the flow of material and liquid in another direction when the valves J J' are closed during operation of the machine, preferably back into the tanks, thus allowing the pumps to be continuously operated. The stems of the relief-valves extend outward through perforations in arms M M, supported on the vavles. These stems are threaded and carry nuts M' M', which bear against elastic cushions or springs $m$ $m$, inserted between them and the arms and surrounding the stems. These cushions resist the opening of the valves until the pressure in the pipes is increased by the closing of valves J J', and by adjusting the nuts M' M' the valves may be made to act at the desired degree of pressure. If desired, the material-pump may be of a size, or operated at a speed, to supply a much larger amount of material and liquid than is required for use in the separator, which excess by the proper adjustment of the material-valve J would be constantly returned through the relief-valve to the supply-tank, and if the pipe from the relief-valve were properly extended down into the tank the flow would be of sufficient quantity and force to agitate the material therein without the use of other means.

Extending from the pipes H H' above the treatment vessel are short branch pipes N N, in which are valves N' N'. To these pipes may be attached auxiliary pipes (indicated at $N^2 N^2$) for feeding material or liquid, or both, at another point about the separating-surface. When used, the valves N' N' might, if desired, be automatically operated in a similar manner to those above described.

Upon the shaft $K^2$ is a cam $n$, against which bears a roller $n'$ upon a lever O, pivoted at O' in the upper part of the frame, the roller being held constantly against the periphery of the cam by a spring $O^2$, interposed between the lever and the beam upon which it is pivoted. The opposite end of the lever is pivotally connected to a bar $o$, which forms a part of a belt-shifter $o'$ for moving the main driving-belt upon the cone-pulley B'. The belt-shifting mechanism is supported and guided by a skeleton sleeve $o^2$, sliding freely upon the counter-shaft. As the cam rotates it moves the belt by means of the interposed parts from one end of pulley B to the other, increasing and decreasing the speed of rotation of the counter-shaft, and therefore of the separating vessel and vibrating cam driven thereby, for the purpose hereinafter stated. The cams K K' and $n$ are of variable contour or outline, being made up of a solid circular plate or hub P, having a circularly-arranged series of threaded holes P'. Upon the periphery of the plate rest a number of removable sections or blocks $P^2$, secured in place by ears projecting over one face of the plate and having holes through which screws pass and take into those in the plate. Interposed between the blocks $P^2$ are intermediate blocks $p$, held in place by dowel-pins $p'$, projecting into recesses in the adjoining blocks. The number and shape of these sections or blocks may be varied, thus changing the outline of the cam-surface, and consequently the motion of the parts they actuate.

About the separating vessel, and in proximity thereto, is a double inclined annular receptacle or trough Q, divided into two concentric portions or divisions Q' $Q^2$, the openings to which are vertically disposed one above the other to enable each to be brought opposite the discharge-opening $G^2$ of the vessel. These two divisions Q' $Q^2$ are to receive the lighter and heavier substances, respectively, which are conducted by pipes $q'$ $q^2$ to suitable receptacles. The trough is supported by rods R R at its opposite sides, these rods being hung to the ends of arms R' R', the opposite extremities of which surround a rocking shaft $R^2$ and are secured thereto by set-screws. This shaft $R^2$ has movably secured upon it a projection or finger $r$, which is engaged by a second finger $r'$ near one end of the shaft $K^2$. As shaft $K^2$ rotates the finger $r'$ contacts with the finger $r$, rocking the shaft $R^2$ and thus raising the trough by means of the interposed supporting parts until the opening to the lower division Q' is opposite the discharge-opening at the top of the vessel. To support the trough and retain it in this position after the two fingers have passed out of contact, it is supplied with two vertically-extending diametrically opposite bars S S, which project through perforations in the upper side beams of the frame. These vertical bars are supplied with two recesses or teeth S' $S^2$, which engage a cross-bar $s$, sliding upon the top of the frame and retained in position by arms $s'$ $s^2$, passing through guides $s^3$ $s^3$, and by pins T T, which project through perforations in brackets T' T'. Surrounding the pins T T, and interposed between the brackets and the ends of the sliding bar, are spiral springs $T^2$ $T^2$, which press said bar constantly against the vertical bars S S. When the trough is raised by the finger $r'$, the bar $s$ is forced under the teeth S', and thus supports the trough in its raised position.

To lower the trough to enable the treatment vessel to discharge into the other division $Q^2$, a curved projection or finger $t$, upon the opposite extremity of shaft $K^2$ from finger $r'$ and secured thereto by a set-screw, engages in its downward movement the end of the arm $s'$, pushing the bar $s$ away from the teeth S' S' and permitting the trough to drop and be caught by the upper teeth $S^2$ $S^2$, which engage the sliding bar as it is pressed back by the springs $T^2$ $T^2$ after the finger $t$ has passed from contact with its arms $s'$. The circumferential adjustment of the fingers $r'$ $t$ about the shaft $K^2$ allows the time of movement of the trough to be changed with relation to the other moving parts.

The adjustment of the friction-roll L toward and from the center of the disk L' changes the speed of rotation of the shaft $K^2$, and therefore the rate at which the cams and fingers thereon actuate the contacting parts. This varies the length and frequency of the periods of separation and removal of heavier substances.

The operation of the machine is as follows: The rollers on the valve-stems and the lever O being at the point $x$ on their respective cams (this occurring simultaneously) the valve J is open and the valve J' closed and the material, in a finely-divided state and mingled with a liquid, is fed through the pipe H into the separating vessel, which is being rotated at a speed sufficient to develop the desired centrifugal force, the main driving-belt being held by the shifting mechanism at the larger end of the cone-pulley B'. The material and liquid pass under the deflecting-ring and over the separating-surface, where they are separated by the action of centrifugal force, aided by the vibration imparted to the separating-surface by the concussion of the shaft as it falls and the unequal distribution of weight about the vessel, causing the greater part of the heavier material to be precipitated upon the separating-surface and accumulate and the lighter to wholly or partially remain suspended in the liquid and be carried along by its flow and discharged through the opening $G^2$ into the division $Q'$ of the surrounding trough, which is in its raised position. During this time the clear liquid is being wholly returned by the pump $h'$ to its tank through the relief-valve, unless it be desired to supply a gentle spray to aid the discharge of lighter substances, which may be effected by properly adjusting the actuating-cam of valve $J'$. The period of separation and discharge of lighter material continues until the rollers reach the point $y$ on the cams, when the valve J is closed, the valve $J'$ opened, the speed of rotation of the vessel and the vibrating cam increased by the movement of the driving-belt to the smaller end of the pulley $B'$, and the trough lowered by the action of finger $t'$, which moves the retaining-bar and permits it to drop. As a result of these changes the feed of material ceases and the heavier substances accumulated on the separating-surface are disturbed by the increased vibration, which assists in loosening them and discharging them from the treatment vessel by the increased centrifugal force and flow of liquid into the division $Q^2$ of the trough to be conducted away to a suitable receptacle. At the end of the period of removal of heavier material the elements are restored to the condition first described by the cams and the finger $r'$ and separation recommences.

By means of the adjustments of the various actuating parts already described the intensity and time of application of the various forces, and the length and frequency of the periods of separation and discharge may be varied as desired.

Obviously many changes in the details of construction of the machine may be made without departing from the spirit of the invention.

What I claim as my invention, and desire to secure by Letters Patent, is—

1. In a centrifugal separator, the combination of a rotatable vessel, a tank containing material, a continuously-operating pump for intermittently delivering said material from the tank to the vessel, and means for diverting the flow back into the tank during the period of non-delivery, substantially as described.

2. In a centrifugal separator, the combination of a rotatable vessel, means for feeding material from a suitable receptacle to said vessel during the separating period, and a liquid from a similar source during the removal of heavier substances, and means for diverting the feed of material from the vessel back to its receptacle during the removing period, and the liquid similarly during the separating period, substantially as described.

3. In a centrifugal separator, the combination of a rotatable vessel, a double receptacle in proximity thereto, and automatic means for raising and lowering said receptacle to receive lighter and heavier material separately, substantially as described.

ORRIN B. PECK.

Witnesses:
GEO. C. ROSE,
R. H. GARMAN.

It is hereby certified that Letters Patent No. 560,631, granted May 19, 1896, upon the application of Orrin B. Peck, of Chicago, Illinois, for an improvement in "Centrifugal Separators," were erroneously issued to Melinda Peck as sole owner of the invention; whereas said Letters Patent should have been issued to *The Patent Title Company, of same place*, said The Patent Title Company being assignee, by mesne assignments, of the entire interest in said invention, as shown by the assignments of record in this Office; and that the said Letters Patent should be read with this correction therein that the same may conform to the record of the case in the Patent Office.

Signed, countersigned, and sealed this 23d day of June, A. D. 1896.

[SEAL.]

JNO. M. REYNOLDS,
*Assistant Secretary of the Interior.*

Countersigned:
    S. T. FISHER,
        *Acting Commissioner of Patents.*